United States Patent
Cramer et al.

(10) Patent No.: US 12,005,550 B2
(45) Date of Patent: Jun. 11, 2024

(54) METHOD FOR MOUNTING A SHAFT IN A BEARING TRACK OF AN INTERNAL COMBUSTION ENGINE

(71) Applicant: Mahle International GmbH, Stuttgart (DE)

(72) Inventors: Stefan Cramer, Wolfsburg (DE); Frank Dautel, Gerlingen (DE); Justus Himstedt, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 17/553,783

(22) Filed: Dec. 16, 2021

(65) Prior Publication Data
US 2022/0250220 A1   Aug. 11, 2022

(30) Foreign Application Priority Data

Dec. 17, 2020   (DE) ...................... 10 2020 216 176.3

(51) Int. Cl.
*F16J 15/32* (2016.01)
*B25B 27/00* (2006.01)
*F01L 1/047* (2006.01)

(52) U.S. Cl.
CPC .......... *B25B 27/0028* (2013.01); *F01L 1/047* (2013.01); *F16J 15/32* (2013.01); *F01L 2001/0476* (2013.01)

(58) Field of Classification Search
CPC . B25B 27/0028; B25B 27/0092; B25B 27/02; F01L 2303/01; F01L 2303/02;
(Continued)

(56) References Cited

U.S. PATENT DOCUMENTS 10,815,836 B2   10/2020 Curlic et al.
2013/0008693 A1*   1/2013 Okuhara ................... F16L 5/10
                                                                174/152 G
(Continued)

FOREIGN PATENT DOCUMENTS

CN   104619465 A   5/2015
CN   109249344 A   1/2019
(Continued)

OTHER PUBLICATIONS

Chinese First Office Action dated Jun. 20, 2023 and Chinese Search Report dated Jun. 19, 2023 for Chinese Patent Application No. 202111542730.0.

*Primary Examiner* — Lee A Holly
(74) *Attorney, Agent, or Firm* — Fishman Stewart PLLC

(57) ABSTRACT

A method for mounting a shaft in a bearing track of an internal combustion engine, at least one sealing ring is mounted on the shaft such that the at least one sealing ring is widened and is pushed onto a region of the shaft, and at least one circumferential groove is formed on an external diameter of the shaft so that the sealing ring is arranged in the groove. The method may include positioning a calibrating tool having at least two clamping jaws over the at least one sealing ring, displacing the clamping jaws radial inward such that the at least one sealing ring is pushed onto the shaft in the region of the groove, and pressing the at least one sealing ring into the respective groove and force-fitting and form-fitting holding of the sealing ring in the groove.

15 Claims, 2 Drawing Sheets

(58) Field of Classification Search
CPC .... F01L 1/047; F01L 2001/0476; F16J 15/32; F16J 15/3268
See application file for complete search history.

(56) References Cited

U.S. PATENT DOCUMENTS

2016/0163518 A1* 6/2016 Chang ................. B25B 27/0028
29/446
2019/0309657 A1* 10/2019 Curlic ................. F16J 15/3268

FOREIGN PATENT DOCUMENTS

| CN | 213796287 U | 7/2021 |
| DE | 19803779 C1 | 9/1999 |
| DE | 10 2016 224 040 A1 | 6/2018 |
| DE | 102017221380 A1 | 5/2019 |
| WO | 2016015068 A2 | 2/2016 |

* cited by examiner

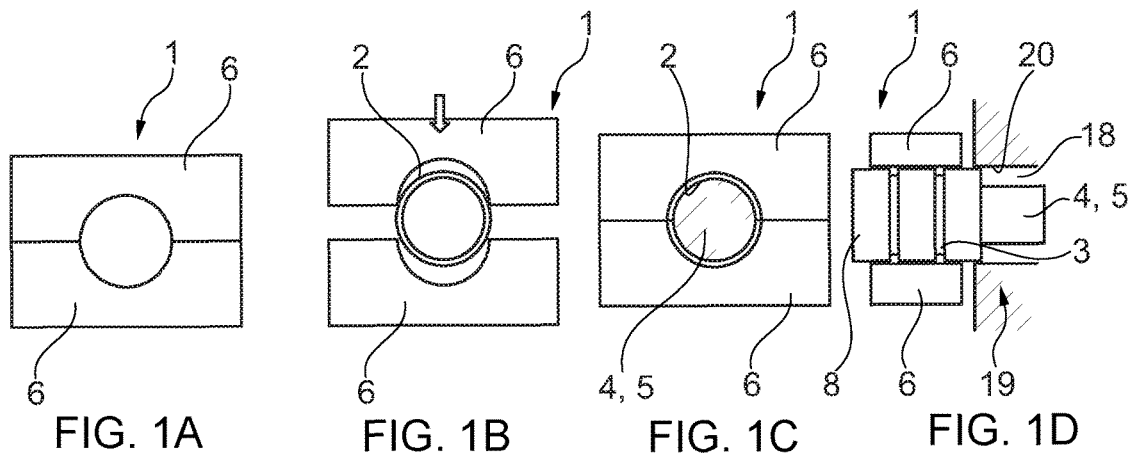
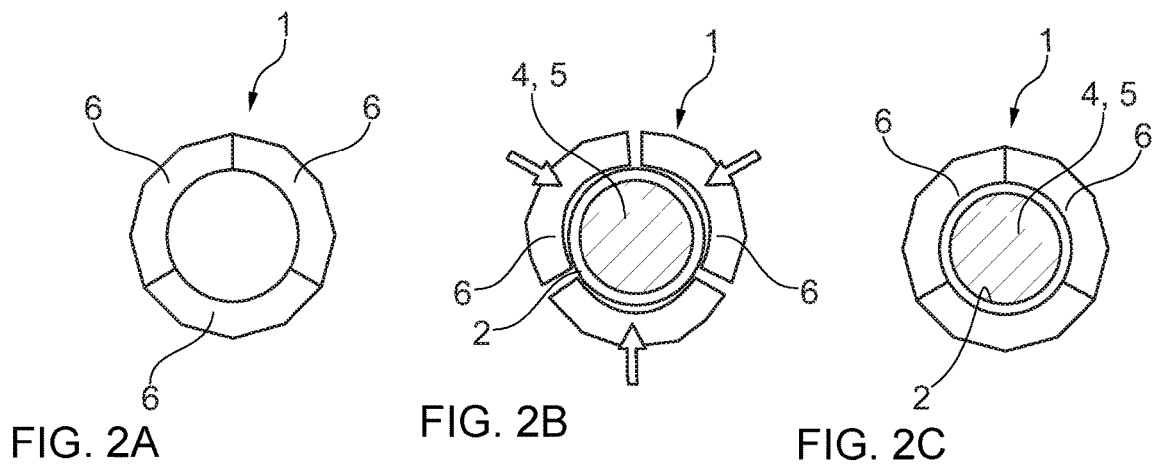
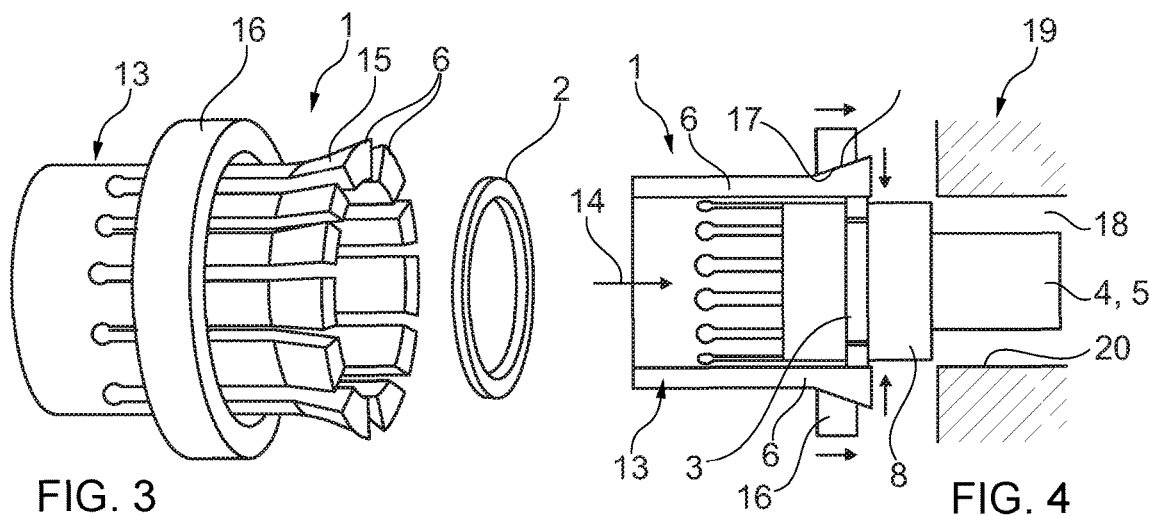

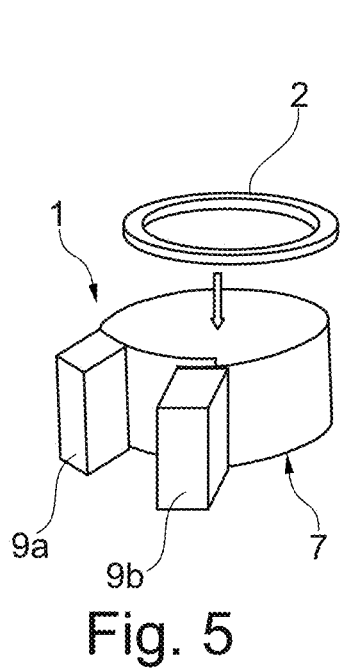 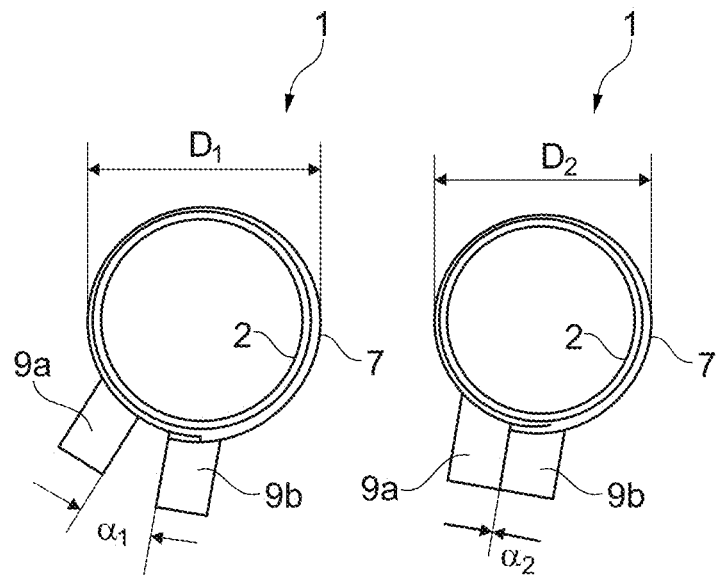
Fig. 5    Fig. 6    Fig. 7
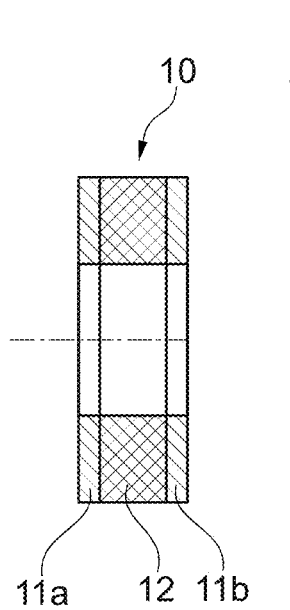 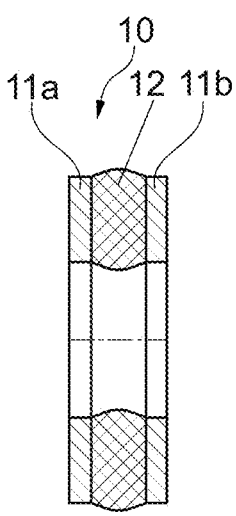 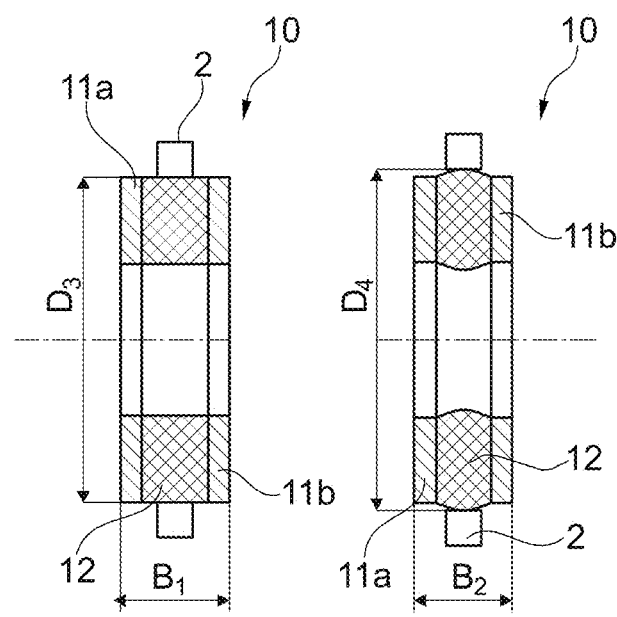
Fig. 8    Fig. 9

METHOD FOR MOUNTING A SHAFT IN A BEARING TRACK OF AN INTERNAL COMBUSTION ENGINE

CROSS-REFERENCE TO RELATED APPLICATION

This application claims priority to German Application No. DE102020216176.3, filed on Dec. 17, 2020, the contents of which is hereby incorporated by reference in its entirety.

TECHNICAL FIELD

The present invention relates to a method for mounting a shaft in a bearing track of an internal combustion engine, in which at least one sealing ring is mounted on the shaft such that the at least one sealing ring is widened and pushed onto a region of the shaft, according to the introductory clause of Claim 1. The invention relates furthermore to a widening tool for widening a sealing ring for such a method, and a calibrating tool for use in such a method.

From DE 10 2016 224 040 A1 a generic method is known for mounting a camshaft in a bearing track of a cylinder head cover of an internal combustion engine, in which the following steps are carried out: mounting at least one sealing ring on the camshaft such that the at least one sealing ring is pushed onto a region of the camshaft in which at least on radially circumferential groove is formed on the external diameter of the camshaft, so that the sealing ring is arranged in the groove. The sealing ring is formed here at least partially from an elastically deformable polymer. Subsequently, a pushing on of a calibrating tool with a rotationally symmetrical opening takes place over at the at least one sealing ring such that the at least one sealing ring is pressed into the respectively groove on the camshaft and is held therein a force-fitting and form-fitting matter. Hereby, in particular, an undesired damaging of regions of the sealing ring projecting over the camshaft is to be prevented.

A disadvantage in the method known for the prior art, however, is that the use of the calibrating tool, described there, for pressing the sealing ring into the associated groove on the camshaft requires a specific axial travel path which is often not able to be implemented in modern engine compartments and thus confined installation space conditions.

SUMMARY

The present invention is based on the general idea, in a method for mounting a shaft in a bearing track of an internal combustion engine, of realizing a calibrating or respectively compressing of a sealing ring by a radially moving tool, whereby in particular in axial direction a distinctly smaller operating space is required than in the case, for example, of a calibrating tool known from the prior art which is displaceable in axial direction for compressing the sealing ring. In the method according to the invention, in addition two alternatives present themselves, namely on the one hand through a calibrating tool with radially displaceable clamping jaws, and on the other hand through a calibrating tool with a displaceable band clamp, wherein both methods are explained more closely below. In the method according to the invention for mounting a shaft, for example a camshaft, in a bearing track of an internal combustion engine, at least one sealing ring is mounted on the camshaft such that said sealing ring is firstly widened and is pushed onto a region of the camshaft in which at least one radially circumferential groove on the external diameter of the camshaft is formed, so that the sealing ring can be arranged in the groove.

Subsequently, according to a first alternative of the method according to the invention, a calibrating tool having at least two radially displaceable and partially circular clamping jaws is positioned over the at least one sealing ring. After the positioning, a radial inward displacing of the clamping jaws takes place until their smallest internal diameter is greater than the external diameter of the camshaft in the region of the respective groove and smaller than the external diameter of the at least one sealing ring which is pushed onto the camshaft in the region of the groove. The individual clamping jaws therefore have, in non radially inwardly displaced state, an internal diameter which is greater than the external diameter of the sealing ring, so that the positioning of the calibrating tool over the sealing ring is possible in a comparatively simple manner. An internal diameter formed by the clamping jaws is only reduced through the radial inward displacing of the clamping jaws and thereby presses the sealing ring, which can be formed as a closed sealing ring but also as an open sealing ring, into the groove. The pressing of the at least one sealing ring into the respectively associated groove therefore takes place via the radially inwardly displaced clamping jaws, as well as a force-fitting and form-fitting holding of the sealing ring in the groove.

In a second alternative of the method according to the invention, firstly a calibrating tool having a displaceable band clamp is positioned over the at least one sealing ring which is to be calibrated or respectively compressed, and subsequently the band clamp is tightened and thereby its internal diameter is reduced until its smallest internal diameter is greater than the external diameter of the shaft in the region of the respective groove and smaller than the external diameter of the at least one sealing ring which is pushed on the camshaft in the region of the groove. Subsequently, here also a pressing of the at least one sealing ring into the respective groove takes place, as well as a force-fitting and form-fitting holding of the sealing ring in the groove. Such band clamps can be constructed in a similar manner to hose clamps and can have for example a worm thread or two retaining brackets which are able to be pressed together.

Both alternative embodiments of the method according to the invention have in common, however, that they require in axial direction a distinctly smaller operating space compared to the calibrating tool known from the prior art, whereby a mounting of a shaft in a bearing track of an internal combustion engine with at least one sealing ring is also possible in confined engine compartments and hence confined space conditions.

In an advantageous further development of the method according to the invention, the shaft is introduced into a bearing of a bearing track. Through the at least one sealing ring, which is calibrated or respectively compressed by means of the calibrating tool, the shaft, for example a camshaft, can be pushed into an associated bearing track, wherein the calibrating tool prevents a sealing ring, projecting over the external diameter of the shaft, from being damaged on pushing into the bearing track. The calibrating tool can be removed or withdrawn from the bearing here on pushing in of the shaft into the bearing track from the shaft and thereby the sealing ring can be freed so that the latter is pre-tensioned in its final position from the interior against an internal surface area of the bearing. The bearing track can be arranged here on a cylinder head or on a cylinder head cover of the internal combustion engine. Through the removing or respectively withdrawing of the calibrating tool during the introducing of the shaft into the bearing track, the shaft can be mounted in a simple manner without the risk of a damage to the sealing ring or respectively sealing rings.

In an advantageous further development of the method according to the invention, the shaft is cooled before the introducing into the bearing of the bearing track and/or before the positioning of the calibrating tool before the mounting of the at least one sealing ring. Purely theoretically, this can take place alone or else with the sealing ring already pushed on, wherein the cooling of the shaft with or without the sealing ring enables both a simplified applying of the sealing ring on the shaft and also a simplified mounting of the shaft in the bearing track of the internal combustion engine, because through the cooling, for example with liquid nitrogen, a reduction of the external dimensions of the shaft is achieved. If, for example, the calibrating tool is also cooled, then the latter also contracts, which with a calibrating or respectively compressing of the sealing ring can lead to a more intensive deformation by compression thereof and hence to a deeper pressing thereof into the respective groove.

Expediently, the at least one sealing ring is pressed by means of the calibrating tool into the associated groove so far that the internal surface area of the sealing ring in the region of its smallest internal diameter does not reach the base of the respective groove. Thereby in particular a risk of a damage to the sealing ring during mounting can be at least reduced and, at the same time, the sealing effect which is able to be achieved through the elastic prestressing of the sealing ring into the groove and the elastic deformation of the sealing ring which is thereby brought about, can be improved. This is due to the fact that the sealing ring does not touch the base of the associated groove on the shaft during the mounting and also during the operation of the internal combustion engine.

In a further advantageous embodiment of the solution according to the invention, a sealing ring is used which is formed at least partially from an elastically deformable polymer, in particular from a polytetrafluoroethylene (PTFE). PTFE is an unbranched, linearly structured and partially crystalline polymer, which is very inert and thereby extremely suitable for use in internal combustion engines, for example also with the presence of aggressive fluids, such as oils for example. Furthermore, PTFE has low friction coefficients, wherein the static friction is equally as great as the sliding friction, which is of great advantage in particular for a starting of an internal combustion engine and a transition, connected therewith, from a standstill to a rotation of the shaft. In addition, PTFE has an extremely small surface tension and is thereby only to wet or respectively to adhere with difficulty, whereby in particular also an adhering of particles to such a sealing ring is not possible or is only possible to a greatly reduced extent.

In an advantageous further development of the method according to the invention, for widening of the sealing ring for the pushing of the latter onto the region of the camshaft, a widening tool with two ring discs and one elastomer ring disc arranged therebetween is used, wherein an external diameter of the widening tool is at a maximum equal in size to an internal diameter of the sealing ring. Here, the sealing ring is firstly pushed onto the elastomer ring disc of the widening tool and subsequently the two ring discs, which can be formed for example from a hard plastic or respectively from metal, are moved axially towards one another, whereby the elastomer ring disc is compressed in axial direction and widens radially outwards. Through the radial outward widening of the elastomer ring disc, at the same time the sealing ring, which is arranged thereon, is also widened. Subsequently, the sealing ring can be pushed onto the region of the camshaft with the groove and further into the groove. Such a widening tool offers here the great advantage that a favorably priced and structurally extremely simply constructed widening tool can be provided which, however, enables a reliable and uniform widening of the sealing ring and hence also a simple pushing of the latter onto the shaft.

The present invention is further based on the general idea of indicating such a widening tool with two ring discs, for example of plastic or of metal, between which the previously described elastomer ring disc is arranged, for example welded or bonded. An axial moving towards one another and hence a compressing of the elastomer ring disc can be brought about here by a displacement mechanism which has for example a sleeve and a tension stamp, wherein the sleeve rests on the one ring disc and the tension stamp, guided coaxially through the sleeve, rests on the other ring disc. Through an axial displacing of the tension stamp relative to the sleeve, a compressing of the elastomer ring disc and hence a widening thereof and a widening of a sealing ring arranged thereon can take place.

The present invention is further based on the general idea of indicating a calibrating tool for the first alternative of the method described in the previous paragraphs, which has a clamping sleeve with at least two clamping jaws which are radially displaceable and extend in a finger-like manner in axial direction. The clamping jaws have here at their free end respectively a conically outwardly widening outer surface, wherein in addition a fixing ring is provided which is axially displaceable on the clamping sleeve and with a conical internal surface area. The conical internal surface area of the fixing ring is formed here in a complementary manner to the conically outwardly widening external faces on the clamping jaws, so that the finger-like clamping jaws move radially inwards, in so far as the fixing ring is pushed with its conical internal surface area onto the conically outwardly widening external faces of the finger-like clamping jaws. Hereby, a reliable calibrating or respectively compressing of a sealing ring, arranged within the clamping jaws, can take place with an extremely small axial installation space requirement, wherein the individual finger-like clamping jaws can have a constant internal diameter. It is purely theoretically conceivable here that in total eleven such clamping jaws are provided, wherein purely theoretically also more or fewer, for example three, clamping jaws can be provided, whereby the complexity of the calibrating tool can be reduced.

Further important features and advantages of the invention will emerge from the subclaims, from the drawings and from the associated figure description with the aid of the drawings.

It shall be understood that the features named above and to be explained further below are able to be used not only in the respectively indicated combination, but also in other combinations or in isolation, without departing from the scope of the present invention.

BRIEF DESCRIPTION OF THE DRAWINGS

Preferred example embodiments of the invention are illustrated in the drawings and are explained more closely in the following description, wherein the same reference numbers refer to identical or similar or functionally identical components. There are shown, respectively schematically:

FIG. 1a a view onto a calibrating tool according to the invention for carrying out a method according to the invention with closed clamping jaws, FIG. 1b an illustration as in FIG. 1a, however with opened clamping jaws and inserted sealing ring, FIG. 1c an illustration as in FIG. 1b, however with closed clamping jaws, FIG. 1d a view, partially in section, of a calibrating tool with inserted shaft and pressed-down sealing rings, FIG. 2a an illustration as in FIG. 1a, however with a calibrating tool having three clamping jaws, FIG. 2b an illustration as in FIG. 1b, however likewise with three clamping jaws, FIG. 2c an illustration as in FIG. 1c, however likewise with three clamping jaws.

FIG. 3 a view onto a further possible embodiment of a calibrating tool according to the invention with clamping sleeve and fixing ring, FIG. 4 a view, partially in section, through the calibrating tool according to FIG. 3 with closed clamping jaws and with a sealing ring pressed down into a groove of a shaft, FIG. 5 a further possible embodiment of a calibrating tool according to the invention, with a band clamp, FIG. 6 an axial view onto the calibrating tool illustrated according to FIG. 5, with opened band clamp, FIG. 7 an illustration as in FIG. 6, however with tightened band clamp, FIG. 8a a sectional illustration through a widening tool according to the invention, FIG. 8b an illustration as in FIG. 8a, however with axially compressed widening tool, FIG. 9a an illustration as in FIG. 8a, however with sealing ring arranged thereon, FIG. 9b an illustration as in FIG. 8b, however with a sealing ring arranged thereon and widened.

DETAILED DESCRIPTION

According to FIG. 1 to 7, a calibrating tool 1 according to the invention is shown, by means of which a sealing ring 2 can be calibrated or respectively compressed and thereby pressed into a groove 3 of a shaft 4, for example a camshaft 5 (cf. FIGS. 1b to d, 2b and c, FIG. 4). The calibrating tool 1 has here at least two radially displaceable partially circular clamping jaws 6, (according to FIG. 1a to d, two clamping jaws 6, according to FIG. 2a to c, three clamping jaws 6 and according to FIG. 3 a total of eleven clamping jaws 6). In the case of the calibrating tool 1 according to FIG. 5 to 7, this has a displaceable band clamp 7, by which through a contracting, a reducing of a diameter D of the sealing ring 2 can be achieved.

A method according to the invention for mounting a shaft 4 in a bearing track 18 of an internal combustion engine 19 is configured here as follows: Firstly, at least one sealing ring 2 is mounted on the shaft 4, in particular the camshaft 5, such that the at least one sealing ring 2 is widened and is pushed onto a region 8 (cf. FIG. 1d) of the shaft 4 in which a radially circumferential groove 3 is formed on the external diameter of the shaft 4, so that the sealing ring 2 is arranged in the groove 3, as is illustrated according to FIGS. 1d and 4.

Subsequently, in a first alternative of the method according to the invention, a positioning of a calibrating tool 1, having at least two radially displaceable and partially circular clamping jaws 6, over the at least one sealing ring 2 (cf. FIG. 1 to 4) and subsequently a radially inward displacing of the clamping jaws 6 until their smallest common internal diameter is greater than the external diameter of the shaft 4 in the region of the respective groove 3 and smaller than the external diameter D of the at least one sealing ring 2 which is pushed onto the shaft 4 in the region of the groove 3. Through the radial inward displacing of the clamping jaws 6, the diameter of the sealing ring 2 is reduced from D1 to D2, whereby the sealing ring 2 is pressed into the groove 3. Through the calibrating tool 1 in addition a force-fitting and form-fitting holding of the sealing ring 2 in the groove takes place on a later introducing of the shaft 4 or respectively of the camshaft 5 in bearing 20 of the bearing track 18, for example of an internal combustion engine 19.

In a second alternative embodiment of the method according to the invention, the use of the calibrating tool 1, having the band clamp 7, according to FIG. 5 to 7 takes place, in which firstly the calibrating tool 1, having the displaceable band clamp 7, is positioned over the at least one sealing ring 2 (cf. FIGS. 5 and 6). Subsequently, a tightening (cf. FIG. 7) and thus an inward displacing of the band clamp 7 takes place until its smallest internal diameter is greater than the external diameter of the shaft 4, for example of the camshaft 5, in the region of the respective groove 3 and is smaller than the external diameter of the at least one sealing ring 2 which is pushed on the shaft 4 in the region of the groove 3. This is illustrated according to FIG. 7. For calibrating or respectively compressing the sealing ring 2 and thus for a reducing of the external diameter D1 to D2, for example two retaining brackets 9a and 9b of the calibrating tool 1 are moved towards one another, so that their originally formed angle $\alpha 1 > 0°$ (cf. FIG. 6) is reduced to $\alpha 2 = 0°$ (cf. FIG. 7). Hereby, a pressing in of the at least one sealing ring 2 into the respectively associated groove 3 takes place, and a force- and form-fitting holding of the sealing ring 2 in the groove 3.

Also in the second alternative embodiment of the method according to the invention, the shaft 4, for example the camshaft 5 can be subsequently introduced or respectively pushed into bearings 20, not shown, of a bearing track 18, wherein the calibrating tool 1, during the introducing of the shaft 4 or respectively of the camshaft 5 into the bearing track 18 is withdrawn or removed from the shaft 4 or respectively the camshaft 5. By means of the calibrating tool 1 according to the invention, in particular an unintended projecting of an external diameter of the sealing ring 2 over the external diameter of the shaft 4 or respectively its region 8 with the groove 3 and thereby a damage to the sealing ring 2 on introducing into the bearing track 18 can be prevented here. For a facilitated mounting, the shaft 4 can be cooled before the introducing into the bearings 20 of the bearing track 18 and/or before the positioning of the calibrating tool 1 before the mounting of the at least one sealing ring 2, whereby the external diameter of the shaft 4 can be reduced and thereby a simplified arranging into the bearing track 18 can be achieved. The shaft 4 or respectively the camshaft 5 can be cooled before the mounting of the at least one sealing ring 2, wherein alternatively it is also conceivable that the shaft 4 or respectively the camshaft 5 is cooled jointly with the already pushed-on at least one sealing ring 2. In both cases, a reducing of the external diameter of the shaft 4, in particular its region 8 and thus also of the groove 3 is possible, in the second case also of the sealing ring 2, whereby the mounting in the bearing track 18 can be facilitated and a risk of damage to the sealing ring 2 can be reduced.

The at least one sealing ring 2 is pressed here with the calibrating tool 1 so far into the at least one groove 3 that an internal surface area of the sealing ring 2 in the region of its smallest internal diameter does not reach a base of the respective groove 3. Hereby, a damage to the respective sealing ring 2 on mounting can be prevented and, at the same time, the sealing effect which is able to be achieved through the elastic deformation of the sealing ring 2 can be improved, because the latter does not touch the base of the respective groove 3 both on mounting and also in operation of the respective internal combustion engine 19.

A shaft 4, in particular a camshaft 5, produced by the method according to the invention or respectively installed into a bearing track 18 of an internal combustion engine 19, and an internal combustion engine 19 with such a shaft 4, in particular such a camshaft 5, is of course also to be placed under protection.

The sealing ring 2 can be formed for example from an elastically deformable polymer, for example polytetrafluoroethylene (PTFE), which is of great advantage in particular for an application in internal combustion engines, because PTFE is resistant with respect to oil and, at the same time, has an extremely low friction coefficient. In addition, PTFE offers the great advantage that both the coefficient of static friction and also the coefficient of sliding friction are of equal amount, which facilitates in particular a rotation start of the shaft 4.

In order to be able to push the sealing ring 2 onto the region 8 of the shaft 4, it must firstly be widened, for which for example a widening tool 10 (cf. FIGS. 8 and 9) can be used. This widening tool 10 according to the invention has here two ring discs 11*a* and 11*b* and an elastomer ring disc 12 arranged therebetween, wherein an external diameter D3 of the widening tool 10 is smaller than, or maximally of equal size as, an internal diameter of the sealing ring 2. Hereby, it is possible to push the sealing ring 2 onto the widening tool 10 without difficulty, as is illustrated according to FIG. 9*a*. For widening the sealing ring 2, subsequently the two ring discs 11*a* and 11*b* of the widening tool 10 are moved towards one another (cf. FIGS. 8*b* and 9*b*), whereby the elastomer ring disc 12 arranged therebetween is compressed and the latter widens radially outwards, which leads to a widening of the sealing ring 2, which is arranged on the elastomer ring disc 12. The internal diameter D3 of the sealing ring 2 thus increases according to FIG. 9*a* on widening to the internal diameter D4 according to FIG. 9*b*. The widened internal diameter D4 of the sealing ring 2 corresponds here to the external diameter of the region 8 of the shaft 4, whereby a problem-free pushing of the sealing ring 2 onto the region 8 of the shaft 4 is made possible.

The two ring discs 11*a*, 11*b* can be formed for example from plastic or from metal, wherein the elastomer ring disc 12 which is arranged therebetween, is welded or bonded with the two ring discs 11*a*, 11*b*. Of course, for the moving of the two ring discs 11*a*, 11*b* towards one another and thus for a compressing of the elastomer ring disc 12 which is arranged therebetween, in addition a corresponding displacement mechanism must be provided, which can be realized for example by a sleeve and a stamp which is guided therein.

Observing further the calibrating tool 1 illustrated according to FIGS. 3 and 4, it can be seen that it has a clamping sleeve 13 with at least two radially displaceable clamping jaws 6 extending in a finger-like manner in axial direction 14, which clamping jaws have at their respective free end respectively a conically outwardly widening outer surface 15. A fixing ring 16, axially displaceable on the clamping sleeve 13, having a conical inner surface area 17, is also provided, wherein the finger-like clamping jaws 6 move radially inwards in so far as the fixing ring 16 is pushed with its conical inner surface area 17 onto the conically outwardly widening outer surfaces 15 of the clamping jaws 6, as is illustrated according to FIG. 4. Hereby, a calibrating or respectively compressing of the sealing ring 2 and thus a pressing thereof into the groove 3 can also be achieved.

In order to achieve as great a roundness as possible and, if applicable, to compensate effects, such as bulging, occurring at an impact of the calibrating tool 1, for example at the transition between the clamping jaws 6, the calibrating tool 1 can be moved apart again after a first calibrating step, and can subsequently be closed again, rotated about an angle. The calibrating tool 1 is thus released after a first radial compressing of the sealing ring 2, is subsequently rotated in circumferential direction to the sealing ring 2 and again subsequently closed again, whereby the sealing ring 2 is compressed radially once again.

With the method according to the invention, with the widening tool 10 according to the invention and with the calibrating tool 1 according to the invention, a comparatively simple calibrating or respectively compressing of the sealing ring 2, and requiring little installation space in axial direction 14, is possible and of great advantage, which would not be possible in particular in modern and confined internal combustion engines 19, in which the use of a longitudinally displaceable sleeve would not be possible. With the calibrating tool 1 according to the invention, of course also several sealing rings 2 can be calibrated, i.e. compressed, at the same time.

The invention claimed is:

1. A method for mounting a shaft in a bearing track of an internal combustion engine, wherein at least one sealing ring is mounted on the shaft such that the at least one sealing ring is widened and is pushed onto a region of the shaft, and at least one circumferential groove is formed on an external diameter of the shaft in the region so that the at least one sealing ring is arranged in the at least one groove, the method comprising:

positioning a calibrating tool having at least two radially displaceable partially circular clamping jaws over the at least one sealing ring;

displacing the clamping jaws radially inward until their smallest internal diameter is greater than the external diameter of the shaft in the region of the respective groove and smaller than the external diameter of the at least one sealing ring which is pushed onto the shaft in the region of the groove; and pressing the at least one sealing ring into the respective groove and force-fitting and form-fitting holding of the at least one sealing ring in the groove;

or positioning a calibrating tool having a displaceable band clamp over the at least one sealing ring;

tightening the band clamp until its smallest internal diameter is greater than the external diameter of the shaft in the region of the respective groove and smaller than the external diameter of the at least one sealing ring which is pushed onto the shaft in the region of the groove; and pressing the at least one sealing ring into the respective groove and force-fitting and form-fitting holding of the at least one sealing ring in the groove;

wherein for pushing the at least one sealing ring onto the shaft, the at least one sealing ring is first widened by a widening tool and then pushed onto the shaft in the region of the respective groove; and wherein:

the calibrating tool is released after a first radial compressing of the sealing ring;

the calibrating tool is rotated in circumferential direction with respect to the sealing ring; and the calibrating tool compresses the sealing ring radially again.

2. The method according to claim 1, wherein the shaft is introduced into a bearing of a bearing track.

3. The method according to claim 2, wherein the calibrating tool is withdrawn or removed from the shaft during the introducing of the shaft into the bearing track.

4. The method according to claim 3, wherein the shaft is cooled before the introducing into the bearing of the bearing track and/or before the positioning of the calibrating tool.

5. The method according to claim 1, wherein:

the shaft is cooled before the mounting of the at least one sealing ring, or that the shaft is cooled jointly with the at least one sealing ring.

6. The method according to claim 1, wherein the at least one sealing ring is pressed in with the calibrating tool so far into the at least one groove that an internal surface area of the sealing ring in a region of its smallest internal diameter does not reach a base of the respective groove.

7. The method according to claim 1, wherein the at least one sealing ring is formed at least partially from an elastically deformable polymer.

8. The method according to claim 1, wherein:

for widening the at least one sealing ring for pushing onto the shaft, the widening tool is provided with two ring discs and with an elastomer ring disc arranged therebetween, and an external diameter of the widening tool is smaller than or equal to an internal diameter of the at least one sealing ring;

the at least one sealing ring is pushed onto the elastomer ring disc of the widening tool;

the two ring discs of the widening tool are moved towards one another, so that the elastomer ring disc widens radially outwards and thereby also widens the at least one sealing ring; and the at least one sealing ring is pushed onto the region of the shaft with the respective groove and further into the respective groove.

9. The method according to claim 1, wherein the at least one sealing ring is formed at least partially from a polytetrafluoroethylene (PTFE).

10. A method for mounting a shaft in a bearing track of an internal combustion engine, wherein at least one sealing ring is mounted on the shaft such that the at least one sealing ring is widened and is pushed onto a region of the shaft, and at least one circumferential groove is formed on an external diameter of the shaft in the region so that the at least one sealing ring is arranged in the at least one groove, the method comprising:

positioning a calibrating tool having at least two radially displaceable partially circular clamping jaws over the at least one sealing ring;

displacing the at least two clamping jaws radially inward until their smallest internal diameter is greater than the external diameter of the shaft in the region of the respective groove and smaller than the external diameter of the at least one sealing ring which is pushed onto the shaft in the region of the groove;

pressing the at least one sealing ring into the respective groove and force-fitting and form-fitting holding of the sealing ring in the groove;

wherein after pressing the at least one sealing ring into the respective groove, releasing the at least two clamping jaws, rotating the calibrating tool in a circumferential direction of the at least one sealing ring, and displacing the at least two clamping radially inwards to compress the sealing ring.

11. The method according to claim 10, wherein:

the calibrating tool comprises a clamping sleeve with the at least two radially clamping jaws extending in a finger-like manner in an axial direction, the at least two clamping jaws at their free end have respectively a conically outwardly widening outer surface;

the calibrating tool further including a fixing ring axially displaceable on the clamping sleeve, the fixing ring including a conical internal surface area; and wherein displacing the at least two clamping jaws radially inwards includes moving the at least two clamping jaws radially inwards by axially pushing the fixing ring on the clamping sleeve with the conical internal surface area of the fixing ring on the conically outwardly widening external surfaces of the at least two clamping jaws.

12. The method according to claim 10, wherein for pushing the at least one sealing ring onto the shaft, the at least one sealing ring is first widened by a widening tool and then pushed onto the shaft in the region of the respective groove.

13. A method for mounting a shaft in a bearing track of an internal combustion engine, wherein at least one sealing ring is mounted on the shaft such that the at least one sealing ring is widened and is pushed onto a region of the shaft, and at least one circumferential groove is formed on an external diameter of the shaft in the region so that the at least one sealing ring is arranged in the at least one groove, the method comprising:

positioning a calibrating tool having a displaceable band clamp over the at least one sealing ring;

tightening the band clamp until its smallest internal diameter is greater than the external diameter of the shaft in the region of the respective groove and smaller than the external diameter of the at least one sealing ring which is pushed onto the shaft in the region of the groove; and pressing the at least one sealing ring into the respective groove and force-fitting and form-fitting holding of the sealing ring in the groove;

wherein tightening the band clamp includes moving two retaining brackets of the band clamp circumferentially towards one another, so that an initial angle formed between the two retaining brackets is reduced, thereby compressing the at least one sealing ring.

14. The method according to claim 13, wherein the shaft is introduced into a bearing of a bearing track.

15. The method according claim 13, wherein for pushing the at least one sealing ring onto the shaft, the at least one sealing ring is first widened by a widening tool and then pushed onto the shaft in the region of the respective groove.

* * * * *